United States Patent [19]

Farrell

[11] Patent Number: 4,680,072

[45] Date of Patent: Jul. 14, 1987

[54] METHOD AND APPARATUS FOR PRODUCING MULTILAYERED PLASTIC CONTAINING SHEETS

[75] Inventor: John J. Farrell, Greenbrook, N.J.

[73] Assignee: Wedco Inc., Bloomsbury, N.J.

[21] Appl. No.: 728,711

[22] Filed: Apr. 30, 1985

[51] Int. Cl.⁴ .............................................. B29C 47/06
[52] U.S. Cl. ................................. 156/243; 156/244.11; 156/244.25; 156/276; 156/279; 156/283; 156/500; 156/501; 427/189; 427/195; 427/202; 427/203; 427/407.1; 427/412.3
[58] Field of Search .............. 156/243, 244.11, 244.25, 156/276, 279, 283, 500, 501; 427/189, 195, 202, 203, 407.1, 412.3

[56] References Cited

U.S. PATENT DOCUMENTS

| | | | |
|---|---|---|---|
| 2,888,975 | 6/1959 | Benedict | 156/279 |
| 2,962,786 | 12/1960 | Hawk | 156/244.25 |
| 3,421,927 | 1/1969 | Donaldson et al. | 427/412.3 |
| 3,947,303 | 8/1976 | Iwase et al. | 427/195 |
| 4,044,175 | 8/1977 | Coxon et al. | 427/195 |
| 4,104,416 | 8/1978 | Parthasarathy | 427/203 |
| 4,206,248 | 6/1980 | Schmidlin | 427/195 |

*Primary Examiner*—Caleb Weston
*Attorney, Agent, or Firm*—Sprung Horn Kramer & Woods

[57] ABSTRACT

Multiple layered plastic sheets is produced by sequentially disposing at least two powdered flowable materials onto a melted layer of plastic being conveyed in a given direction. Each material corresponds to a separate layer of the resulting multilayer sheet.

18 Claims, 10 Drawing Figures

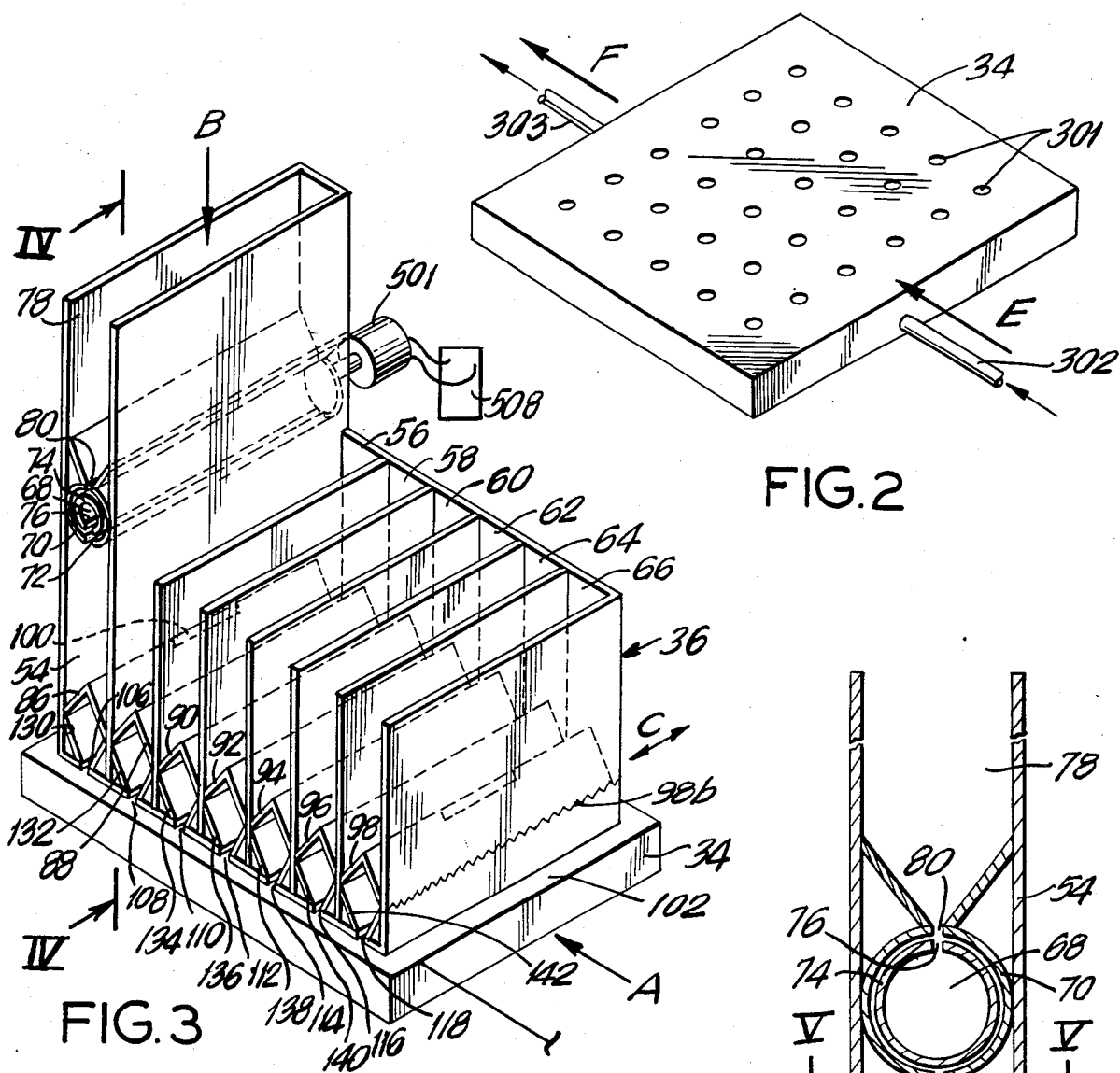
FIG.2
FIG.3
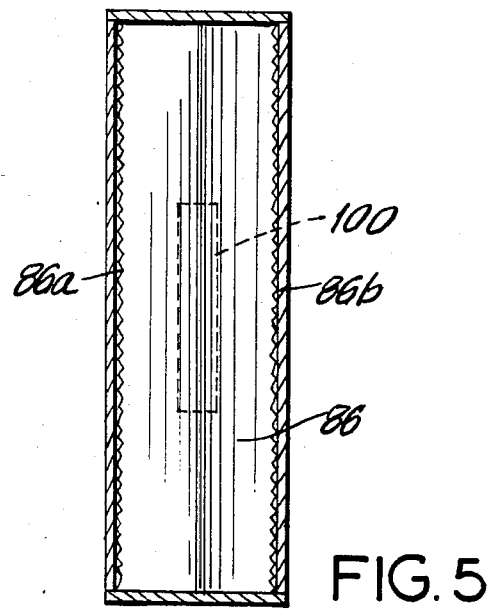
FIG.5
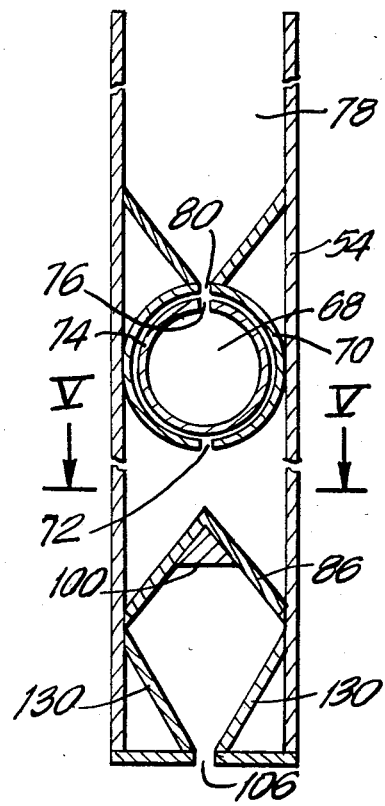
FIG.4

METHOD AND APPARATUS FOR PRODUCING MULTILAYERED PLASTIC CONTAINING SHEETS

BACKGROUND OF THE INVENTION

This invention relates to the production of multilayered plastic containing sheets.

It is known to employ specially formulated polymers such as barrier resins for use in food containers, particularly carbonated beverage containers. However, the use of such barrier resin containers has been limited because of the relatively high cost of such polymers.

One solution is to utilize multilayered sheets to form such containers, such sheets having a thin inner layer of expensive barrier material, backed by a thicker outer layer of relatively inexpensive polymeric material, such as polystyrene or polyethylene.

Heretofore, sheets having multiple layers of plastics were prepared by laminating or by using a separate extruder for each different plastic material. Such procedure, however, is expensive owing to the need for multiple extruders.

SUMMARY OF THE INVENTION

It is an object of the present invention to provide a process to form multilayered thermoplastic sheets without resort to the use of multiple extruders.

The aforesaid object, as well as other objects and advantages of the present invention is provided by a process and apparatus for sequentially disposing at least two powdered flowable materials onto a melted layer of plastic being conveyed in a given direction. A first material layer is disposed upstream of a second material layer, such second layer is disposed downstream of the first layer and disposed on top of the first layer. Each material corresponds to a separate layer of the resulting multilayer sheet. The resultant sheets thus have at least three layers, one of which being the (melted) plastic substrate, with the other layers provided by the powdered materials.

The apparatus according to the present invention includes a means for conveying a melted layer of plastic in a given direction and means for dispensing material onto the plastic layer. Such dispensing means includes means for sequentially disposing at least two powdered flowable materials onto the conveyed plastic layer. The materials are disposed such that, for example, a first material layer is disposed upstream of a second (subsequent) material layer. The second material layer is disposed downstream of the first material layer. The first layer is disposed on top of the plastic layer and the second layer is disposed on top of the first layer.

The means for sequentially disposing at least two powdered flowable materials includes a dispenser having at least two separate compartments. Each compartment has adjacent the top thereof means for delivering material at a particular flowrate (from, for example, a storage bin) to the compartment. Such delivery means includes a double cylinder device wherein a rotatable inner tube having an elongated aperture therethrough is disposed within a stationary outer tube having an elongated aperture therethrough.

The means for sequentially disposing at least two powdered flowable materials also includes a vibrating means disposed adjacent the bottom of each compartment. The vibrating means includes a vibratable element in the shape on an inverted "V". The side bottom edges of the element being adjacent the sides walls of the compartment. Such bottom edges have a saw-tooth configuration to allow material to flow past the edges during vibration. The elements are vibrated by a vibrating bar which is disposed beneath the apex of the inverted "V" element.

The plastic substrate, i.e., melted layer of plastic, can be any thermoplastic, such as for example, polyethylene, polypropylene or nylon.

The powdered materials comprise materials that will form layers on the plastic substrate. Examples of such powdered materials include resins, metals and adhesives to bind the resins to the plastic or to the metals or to other resin layers. Preferred resins for use in the present invention are those resins which are "barrier plastics".

By the term "barrier plastics" it is meant those plastic materials which are resistant to gas permeation and specifically exhibit a resistance or barrier to oxygen permeation.

A most preferred barrier plastic for use as the inner wall or coating, particularly so in containers for beverages, is polyvinylidene chloride (PVDC). Other plastics can be employed as barrier plastics, such as, for example, ethyl vinyl alcohol ("EVAL").

A non-limiting example of an adhesive that can be used in the present invention includes an ethyl vinyl acetate-containing adhesive.

Another example of a plastic that can be used in the present invention is "BAREX" 210 ("BAREX" is a registered trademark of Vistron Corporation, Cleveland, Ohio). "BAREX" 210 is an acrylic thermoplastic resin having an oxygen barrier resistance as measured by an oxygen on rate of about 0.8 cc. mil/100 sq.in. -24 hours-atmospheric-at 73° F. (22.7° C.) by the ASTME 1434-66 test. "BAREX" 210 also exhibits a low water vapor permeation rate of 5.0 gm. mil/100 sq.in.-24 hours-at 100° F. (38° C.)/90% relative humidity by the ASTME 96-63 test.

The size of the particles of the materials is such to allow the same to be flowable, i.e., a powder form. A typical resin particle size would be 5 to 50 microns.

In a preferred embodiment of the present invention, adhesive layers and resin layers are alternatively disposed on the sheet, i.e., an adhesive layer is the first layer disposed on the plastic sheet, thereafter a resin layer is disposed, followed by a second adhesive layer, followed by a second resin layer and so on.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

FIG. 2 is an isometric view of the hot air table depicted in FIG. 1.

FIG. 3 is a prospective view in cross-sectional of a portion of the apparatus depicted in FIG. 1, i.e., the materials dispensing vessel of FIG. 1.

FIG. 4 is a sectional view taken along line IV—IV in FIG. 3.

FIG. 5 is a top plan view taken along line V—V in FIG. 4.

DETAILED DESCRIPTION OF THE INVENTION

Figure 1:
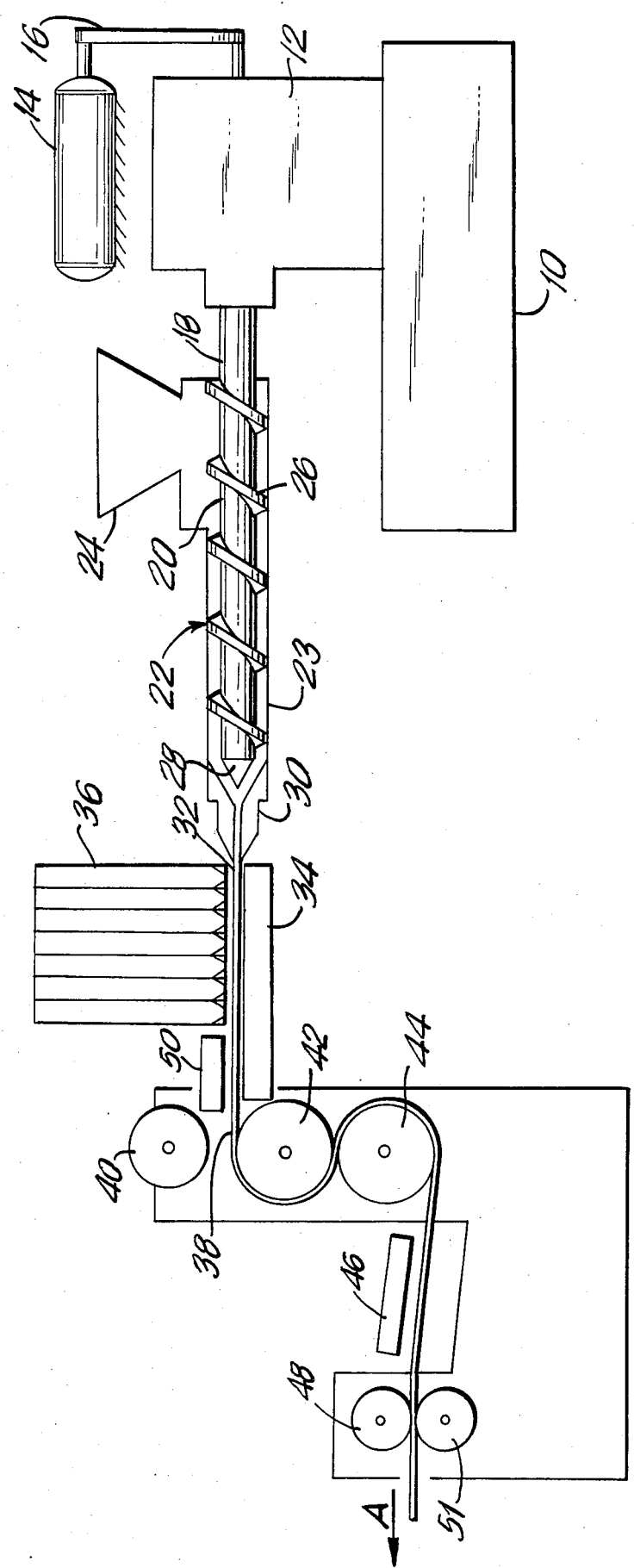
FIG. 1 is a diagrammatic elevation view of an apparatus for conducting the process of the present invention.

Referring to the drawings in detail, wherein like numerals indicate like elements there is shown in FIG. 1 an apparatus for conducting the process of the present invention. Base 10 supports a drive reducer 12 which is coupled to a motor 14 via a belt 16. Drive reducer 12 turns a shaft 18 which is connected to screw 20 having helical threads of extruder 22.

Plastic forming substance passes into the extruder 22 via funnel 24. Screw 20 is rotated in a direction to cause screw threads 26 to advance plastic forming substance toward the front end of the screw 20 in extruder barrel 23 (toward the left in FIG. 1) towards head 28 and through sheet die 30 to form a melted layer of plastic 32 which is supported on a hot air table 34. The hot air table 34 is shown in greater detail in FIG. 2. The hot air table 34 has a plurality of holes 301 on the top surface thereof. Hot air enters the hot air table 34 via conduct 302 and air exists the hot air table 34 via conduct 303. The plastic layer 32 passes over the top surface of the table 34 in the direction of arrows E and F.

Disposed above plastic layer 32 is a material dispenser 36. The dispenser 36 delivers sequentially by gravity flow on the plastic layer 32, at least two different powdered flowable materials. The dispenser 36 is described in greater detail hereinbelow with reference to FIGS. 2 to 5. The dispensed material from dispenser 36 forms layers on plastic layer 32 to form a multilayer sheet 38.

Calendar rolls 40, 42 and 44 transport the multilayer 38 past heater 50 and heater bank 46. The calendar rolls 40, 42 and 44 can have cores for circulating hot or cold media. Heater 50 keeps the temperature of the upper layers of the multilayer sheet 38 hot enought to insure melting of the last applied resin particles. The heater bank 46 prevents curling. Pull rolls 48 and 51 transport the multilayer sheet in the direction of arrow A into a further apparatus (not shown) for either shearing into sheets or rolling (and then shearing).

In FIG. 3, the dispenser 36 is shown in detail. The dispenser 36 has separate compartments 54, 56, 58, 60, 62, 64 and 66. The number of compartments used depends on the number of layers, i.e., the dispenser 36 has multiple compartments or bins. Although seven such compartments are shown in FIG. 2, according to the present invention at least two of such compartments are necessary. The number of compartments n equals the number of layers L minus 1 (n=L−1, with 1≧3); i.e., the substrate is the bottom layer and each additional layer requires a separate compartment in the dispenser 36.

At the top of compartment 54 is a double cylinder metering device 68 (for the sake of clarity only one such device 68 is depicted in FIG. 3, although such device would be at the top of each of compartments 56, 58, 60, 62, 64 and 66). The metering device 68 (shown in detail in FIG. 4) is composed of a stationary outer tube 70 having an elongated aperture 72 and a rotating inner tube 74 having an elongated aperture 76. Inner tube 74 is disposed within outer tube 70. Material flows into hopper 78 (although only one hopper is shown for the sake of clarity, it is contemplated that there would be a hopper for each compartment) in the direction of arrow B and passes through elongated aperture 80 in stationary outer tube 70 and into inner tube 74 when apertures 80 and 76 are in alignment as shown in FIG. 4. Material drops into compartment 54 when aperture 72 and 76 are in alignment (this situation is depicted in FIG. 3).

Figure 6:
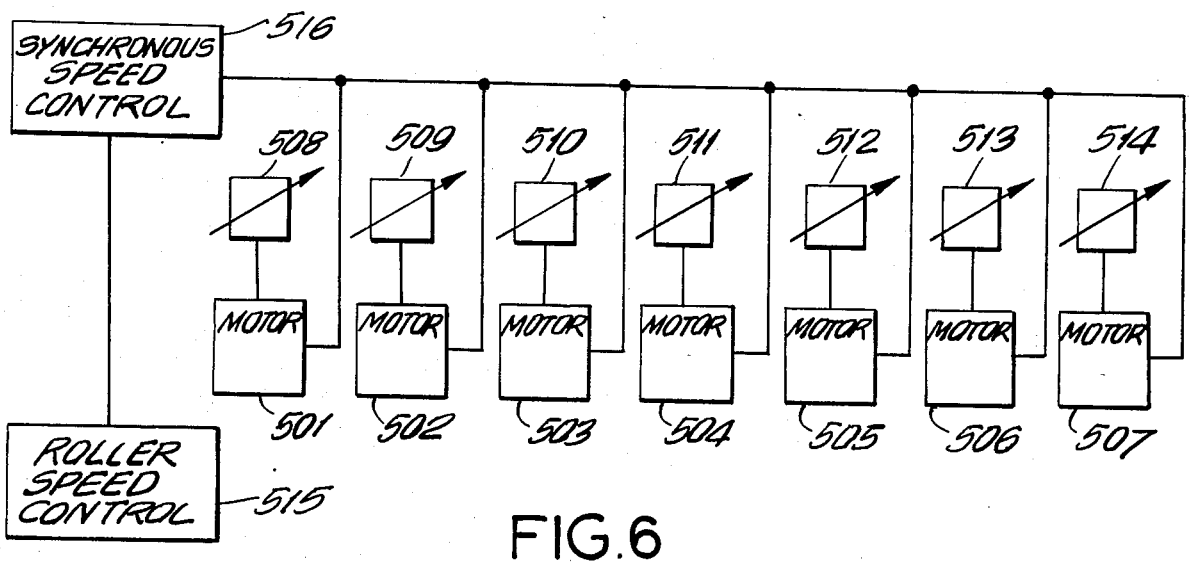
FIG. 6 is a diagrammatical view of the control system for the motors depicted in FIG. 3.

A variable speed motor 501 controlled by controller 508, rotates the inner tube 74 (the control system is depicted in FIG. 6). The speed of the motor 501 determines the flow rate of material into each compartment and acts to stop flow entirely when sheet 32 stops moving, i.e , in such case the motor 501 is shut off.

At the bottom of each compartment 56, 58, 60, 62, 64 and 66 is a vibratable element, respectively, 86, 88, 90, 92, 94, 96 and 98. The vibratable elements 86, 88, 90, 92, 94, 96 and 98 serve to agitate the material and aid in the gravity flow of material and further, act as second metering means. Each vibratable element 86, 88, 90, 92, 94, 96 and 98 is in the shape of an inverted "V" and has saw tooth shaped bottom edges to allow a metered amount of material to flow. See FIG. 5 where element 86 is depicted having bottom edges (legs) 86a and 86b and in FIG. 1 see bottom edge 98b. Each vibratable element 86, 88, 90, 92, 94, 96 and 98 is supported by a "V" shaped support member, respectively 130, 132, 134, 136, 138, 140 and 142. The "V" shaped support members 130, 132, 134, 136, 138 and 140 terminate respectively in elongated apertures 106, 108, 110, 112, 114, 116 and 118.

The vibratable elements 86, 88, 90, 92, 94, 96 and 98 move in the direction of arrow C, i.e., in a back-and-forth direction by means of a vibrator bar (one such vibrator bar 100 is depicted in FIG. 4). The vibrator bar is directly beneath the apex of the inverted "V" shaped vibratable element (see FIG. 4 depicting vibratable element 86 and vibrator bar 100). The vibrator bar 100 is moved by means of a motor, not shown. The vibratable element 86 is shown in detail in FIGS. 4 and 5. The amount of vibration determines the amount of disposed material and the width of the layer. Width layer may vary from, for example, 0.005 to 0.01 or 0.002 or 0.001 inches.

Material passes out of each compartment 54, 56, 58, 60, 62, 64 and 66 at the bottom ends thereof via elongated apertures 106, 108, 110, 112, 114, 116 and 118, respectively.

FIG. 6 shows the control system for the motors 501, 502, 503, 504, 505, 506 and 507 for each metering device (not shown in FIG. 6, but see FIG. 1 where 501 is shown for one such metering device 68). Each motor 501, 502, 503, 504, 505, 506 and 507 has its own controller, respectively, 508, 509, 510, 511, 512, 513 and 514. Additionally, a roller feed controller 515 is electrically connected to a synchronous speed control 516 which is electrically connected to each motor 501, 502, 503, 504, 505, 506 and 507. Further, each motor 501, 502, 503, 504, 506 and 507 can be individually set to give a separate flow rate for each compartment to account for the different particle size distributors, densities and viscosities of the flowing powders.

Figure 7:
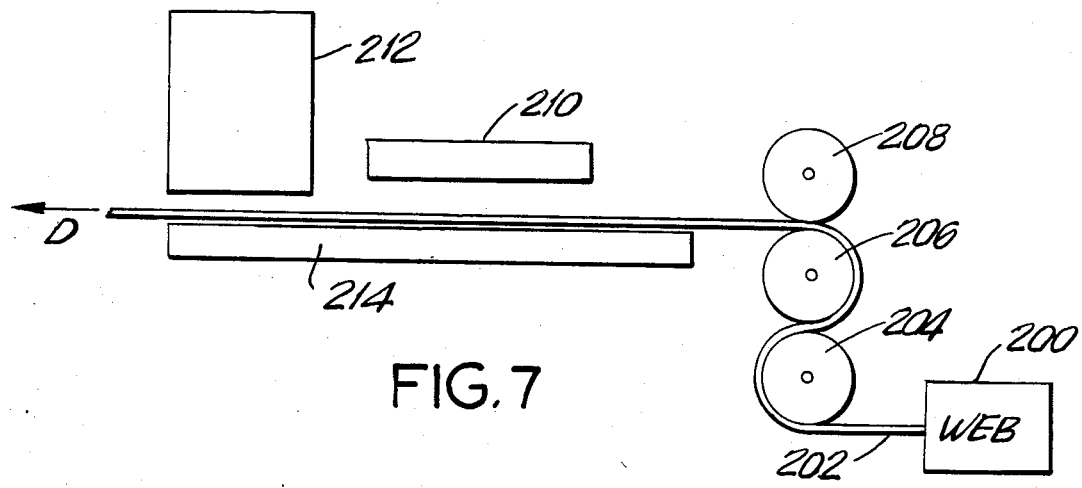
FIG. 7 is a diagrammatical elevation view of apparatus according to the present invention for conducting another embodiment of the process of the present invention.

In FIG. 7, there is shown an alternate embodiment of the present invention. From a web of finished plastic travelling in the direction of arrow D, a sheet of plastic (containing one or more layers) is conveyed by rollers 204, 206 and 208 past a heater 210. Heater 210 raises the temperature of the sheet 202 so as to transform the plastic into a melt phase. The plastic sheet, supported on the bottom surface thereof by hot air table 214, is then conveyed past a dispenser 212 (such dispenser has been described hereinabove in detail with respect to dispenser 36 in FIG. 3). At this point, the sheet is processed much in the same way as discussed above with regard to FIG. 3.

Figure 8:
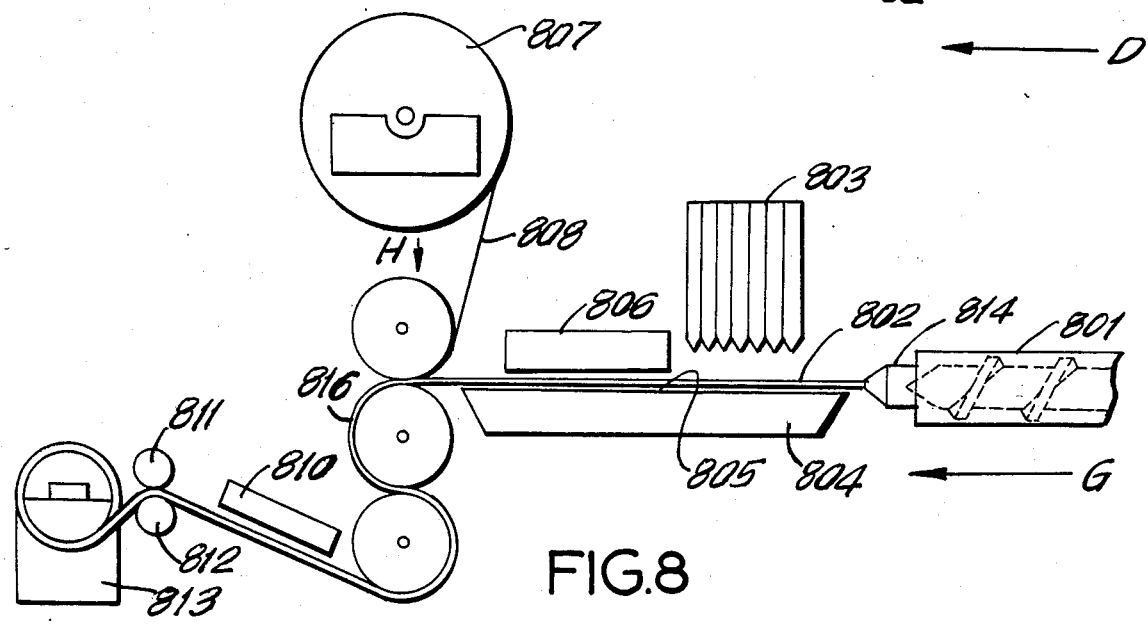
FIG. 8 is a diagrammatical elevational view of an apparatus for carrying out a further embodiment of the present invention.

In FIG. 8, another embodiment of the present invention is depicted wherein an extruder 801 extrudes a plastic layer 802 in the direction of arrow G past sheet die 814 and past a dispenser 803, such dispenser described hereinabove with reference to dispenser 36. The plastic layer 802 is supported on its bottom surface thereof by a hot air table 804. Such hot air table 804 is described hereinabove with reference to hot air table 34. A web heater 806 is disposed over the multilayer sheet 805 that is formed after materials from dispenser 803 are disposed on plastic layer 802. An unwinder 807 delivers a plastic layer 808 in the direction of arrow H so as to dispose the same on multilayer sheet 805. Calender rollers 809, 810, and 811 then convey the sheet 806 (which is a composite of sheet 808 on sheet 805), past an anti-curl heater 810 and past pull rollers 811 and 812, then convey the sheet 816 to a winder 813.

Figure 9:
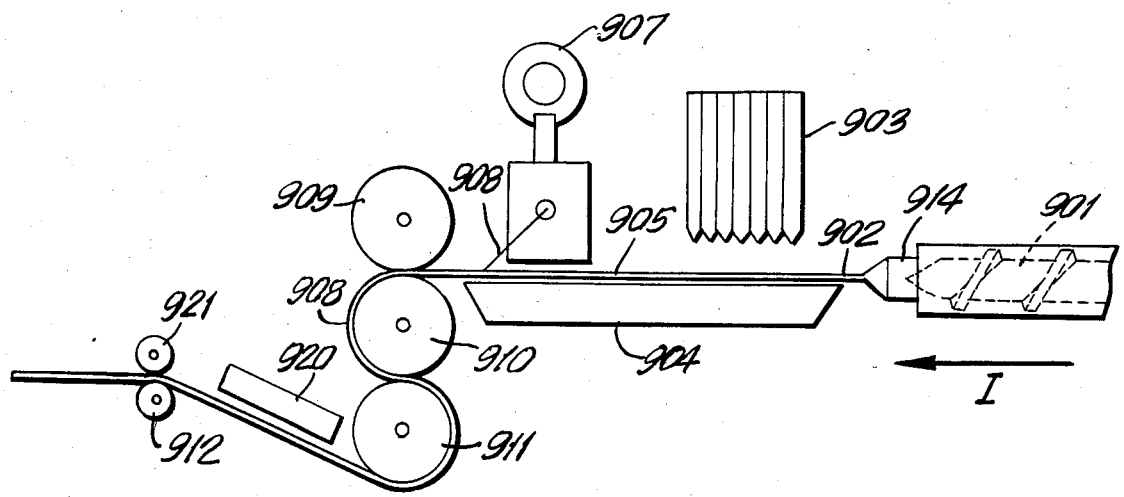
FIG. 9 is a diagrammatical elevation view of an apparatus for carrying out a still further embodiment of the present invention.

In FIG. 9, a further embodiment of the present invention is depicted wherein a bottom layer extruder 901, extrudes a plastic layer 902 in the direction of arrow I, past sheet die 914 and past a dispenser 903, such dispenser 903 described hereinabove with reference to dispenser 36. The plastic layer 902 is supported on its bottom surface by a hot air table 904. Such hot air table 904 is described hereinabove with reference to hot air table 34. The multilayer sheet 905 that is formed after materials from dispenser 903 are disposed on plastic layer 902 is contacted with a sheet of plastic 908 from top layer extruder 907. Sheet 908 exits from top layer extruder 907 at an approximate 45° angle from sheet 905. Calender rollers 909, 910, and 911 then convey the sheet 906 (which is a composite of sheet 908 on sheet 905), past an anti-curl heater 920 and pull rollers 921 and 912, and then convey the sheet 906 to a winder (not shown).

Figure 10:
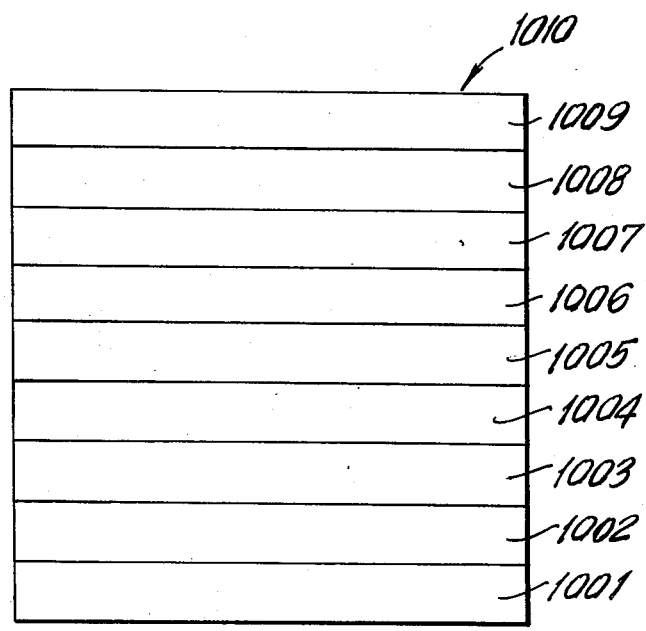
FIG. 10 is a schematic representation of a multilayer sheet produced according to the present invention.

FIG. 10 schematically depicts a multilayer sheet 1010 composed of a bottom polyethylene layer 1001, an adhesive layer 1002 on the top thereof, a barrier layer 1003 (either composed of for example, EVAL or PVDC) on the top thereof, an adhesive layer 1004 on the top thereof, a polyethylene layer 1005 on the top thereof, an adhesive layer 1006 on the top thereof, a barrier layer (for example, EVAL or PVDC) 1007 on the top thereof, an adhesive layer 1008 on the top thereof and a top polypropylene layer 1009.

EXAMPLE

A melted layer of polyethylene having a thickness of 0.002 to 0.0125 inches, preferably 0.006 inches is extruded and is conveyed at a temperature of 320° F./700° F., preferably 500° F. and at a speed of 10–1000 feet/minute, preferably 500 feet/minute past a dispenser wherein polyvinylidene chloride, which is rotated into a first bin of the dispenser at a speed of 1 to 100 rpm, preferably 50 rpm, falls by gravity flow out of the first bin at a flowrate of 1 to 2 lbs/minute The polyvinylidene chloride thereby forms a polyvinylidene layer on the polyethylene, such polyvinylidene chloride layer having a thickness of 0.0002 to 0.020 inches, preferably 0.010 inches. The polyethylene-polyvinylidene chloride composite is conveyed in the same given direction past the dispenser and, an adhesive, namely an ethylvinyl acetate-containing adhesive, which is rotated into a second bin of a dispenser at a speed of 0 to 100 rpm, preferably 50 rpm, falls by gravity flow out of the second bin of the dispenser at a flowrate of 0.5 to 2 lbs/minute and is disposed so as to form an adhesive layer having a thickness of 0.0002 to 0.002 inches, preferably 0.005 inches, on the polyvinylidene chloride layer. As the polyethylene-polyvinylidene chloride-adhesive composite continues to be conveyed, polypropylene, which is rotated into a third bin of the dispenser into a third bin of the dispenser at a speed of 1 to 100 rpm, preferably 50 rpm, falls by gravity flow out of the third bin at a flowrate of 1 to 2 lbs/minute, preferably 1.5 lbs/minute and is disposed so as to form a polypropylene layer having a thickness of 0.001 to 0.010 inches, preferably 0.005 inches, on the adhesive layer. The resultant multilayered plastic sheet is then conveyed for subsequent shearing or rolling (with shearing).

It will be appreciated that the instant specification and claims are set forth by way of illustration and not limitation, and that various modifications and changes may be made without departing from the spirit and scope of the present invention.

What is claimed is:

1. A process for the production of a multilayer plastic sheet comprising sequentially disposing at least two powdered flowable materials onto a melted layer of plastic by means of dropping said materials by gravity flow from a storage vessel onto said plastic, said plastic being conveyed in a given direction, each material corresponding to a separate layer of the resulting multilayer sheet.

2. A process according to claim 1, wherein a first material layer is disposed upstream of a second material layer, said second layer disposed downstream of said first layer and disposed on said first layer.

3. A process according to claim 1, wherein at least one of said materials is a barrier layer material.

4. A process according to claim 3, wherein barrier layer material is selected from the group consisting of polyvinylidene chloride and ethyl vinyl alcohol.

5. A process according to claim 1, wherein said plastic is selected from the group consisting of polyethylene, polypropylene and nylon.

6. A process according to claim 1, wherein said materials comprise particles having a size ranging from 5 to 50 microns.

7. A process according to claim 1, wherein said gravity flow is regulated by an agitation means in said vessel.

8. A process according to claim 1, wherein at least one of said materials is an adhesive.

9. A process according to claim 1, wherein said plastic layer is a furnished plastic sheet that is heated to a melted state.

10. A process according to claim 1, wherein said materials comprise resins and adhesives which are alternately disposed onto said sheet.

11. A process according to claim 1, wherein a three layer sheet is produced.

12. A process according to claim 1, which further comprises disposing a sheet of plastic onto said multi-layer sheet.

13. A process according to claim 1, wherein said melted layer of plastic is a finished plastic layer that is heated.

14. A process according to claim 1, wherein said melted layer of plastic is extruded plastic.

15. In an apparatus for producing a multilayered plastic sheet comprising means for conveying a melted layer of plastic in a given direction and means for dispensing material onto said plastic, the improvement which comprises means for sequentially disposing at least two powdered flowable materials onto said layer of plastic, said means for sequentially disposing at least two powdered flowable materials comprising a dispenser having at least two separate compartments, each of said compartments having adjacent the top thereof means for delivering material to said compartments and means for vibrating said material adjacent the bottoms of said compartments, wherein said means for delivering material to said compartments include a double cylinder metering device having a stationary outer tube having an elongate aperture therethrough and a rotating inner tube disposed within said outer tube, said inner tube having an elongate aperature.

16. An apparatus according to claim 15, wherein said vibrating means comprises a vibratable element in the shape of an inverted "V" having saw-tooth shaped bottom edges and a vibrator bar disposed beneath the apex of the inverted "V" element, said vibrator bar agitatable in a back and forth motion.

17. An apparatus according to claim 15, wherein said rotating tube is driven by a variable speed motor.

18. In an apparatus for producing a multilayered plastic sheet comprising means for conveying a melted layer of plastic in a given direction and means for dispensing material onto said plastic, the improvement which comprises means for sequentially disposing at least two powdered flowable materials onto said layer of plastic, wherein said means for sequentially disposing at least two powdered flowable materials comprises a dispenser having at least two separate compartments, each of said compartments having adjacent the top thereof means for delivering material to said compartments, means for delivering material to said compartments and means for vibrating said material adjacent the bottoms of said compartments, wherein said vibrating means comprises a vibratable element in the shape of an inverted "V" having saw-tooth shaped bottom edges, and a vibrator bar disposed beneath the apex of the inverted "V" element, said vibrator bar agitatable in a back and forth motion.

* * * * *

UNITED STATES PATENT AND TRADEMARK OFFICE
CERTIFICATE OF CORRECTION

PATENT NO.  : 4,680,072

DATED       : July 14, 1987

INVENTOR(S) : John J. Farrell

It is certified that error appears in the above-identified patent and that said Letters Patent is hereby corrected as shown below:

Col. 2, line 34        After "oxygen" delete "on" and substitute --permeation--

Col. 3, line 1        After "of" insert --another--

Col. 5, line 2        After "finished plastic" insert --200--

Signed and Sealed this

Twenty-second Day of March, 1988

Attest:

DONALD J. QUIGG

Attesting Officer        Commissioner of Patents and Trademarks